(12) United States Patent
Birsching

(10) Patent No.: US 9,079,608 B2
(45) Date of Patent: Jul. 14, 2015

(54) HYDRAULIC-POWER STEERING SYSTEM WITH MAGNETIC TORQUE OVERLAY

(71) Applicant: Steering Solutions IP Holding Corporation, Saginaw, MI (US)

(72) Inventor: Joel E Birsching, Vassar, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/180,000

(22) Filed: Feb. 13, 2014

(65) Prior Publication Data

US 2014/0224565 A1 Aug. 14, 2014

Related U.S. Application Data

(60) Provisional application No. 61/764,023, filed on Feb. 13, 2013.

(51) Int. Cl.
*B62D 5/083* (2006.01)

(52) U.S. Cl.
CPC .................................. *B62D 5/0835* (2013.01)

(58) Field of Classification Search
CPC ........... B62D 6/00; B62D 6/02; B62D 5/0835
USPC ......... 180/167, 169, 204, 405, 406, 407, 422, 180/423
See application file for complete search history.

(56) References Cited

U.S. PATENT DOCUMENTS

| | | | | |
|---|---|---|---|---|
| 4,570,736 | A | 2/1986 | Waldorf | |
| 5,253,729 | A * | 10/1993 | Suzuki | 180/422 |
| 7,898,139 | B2 * | 3/2011 | Islam et al. | 310/216.069 |
| 8,584,791 | B2 * | 11/2013 | Sakamaki et al. | 180/422 |
| 2007/0235240 | A1 * | 10/2007 | Lauer et al. | 180/204 |
| 2009/0101430 | A1 * | 4/2009 | Sunaga et al. | 180/421 |
| 2012/0247864 | A1 * | 10/2012 | Kubo et al. | 180/422 |

FOREIGN PATENT DOCUMENTS

EP 2028081 B1 9/2014

OTHER PUBLICATIONS

EP Extended Search Report, issued Jan. 19, 2015, in corresponding EP Application No. 14154919.6.

* cited by examiner

*Primary Examiner* — Joseph Rocca
*Assistant Examiner* — Felicia L Brittman
(74) *Attorney, Agent, or Firm* — Cantor Colburn LLP

(57) ABSTRACT

A hydraulic-power steering system is provided. A power-steering valve controls and varies a level of steering assist. A magnetic actuator varies torsional stiffness of the valve to change torque and produce a sufficient amount of the torque to generate full assist. A first valve is operatively connected to a steering pump and allows the full assist at a relatively low steering torque and through which flow from the steering pump is directed. A second valve is operatively connected to the steering pump. Current is applied to a solenoid valve that allows an increasing amount of the flow to be directed through the second valve in response to an input signal of increasing vehicle speed above a threshold value and closes in response to a signal identifying any of a plurality of advanced steering functions.

19 Claims, 3 Drawing Sheets

HYDRAULIC-POWER STEERING SYSTEM WITH MAGNETIC TORQUE OVERLAY

CROSS-REFERENCE TO RELATED APPLICATION

This application is based upon and claims benefit of the filing date of U.S. patent application Ser. No. 61/764,023 filed on Feb. 13, 2013 and entitled "Magnasteer Torque Overlay with Hydraulic Park Assist," which is incorporated herein by reference, in its entirety.

FIELD OF INVENTION

The invention relates to a power-steering system of a vehicle and, in particular, magnetic actuators for use with such a system used for assisting in parking of the vehicle.

BACKGROUND OF INVENTION

A power-steering system in a motor vehicle is designed to provide appropriate hydraulic or electrical steering assist to allow a driver of the vehicle to complete a turn thereof. The driver applies a steering input through a manual steering wheel of the vehicle that is rotationally connected to a first shaft, which, in turn, is rotationally coupled to a second shaft that is, in turn, connected to a steering mechanism. The first and second shafts are coupled and transmit torque to each other by a compliant member, such as a torsion bar. The torsion bar allows the first shaft to rotate with respect to the second shaft by a predetermined number of degrees. Mechanical stops prevent further rotation. The amount of the steering assist applied to the steering mechanism is determined as a function of the degree of torsional strain or movement in the torsion bar.

In a hydraulic-power steering system, the steering assist is controlled by a power-steering valve. Systems have been developed to vary a level of assist as a function of speed of the vehicle.

One example is a "variable effort" system that uses a magnetic actuator to vary torsional stiffness of the power-steering valve to change actuation, effort, or torque (referred to generically as "magnetic steer"). A control module determines magnitude and direction of current applied to an excitation coil of the magnetic actuator to vary the torque as a function of the vehicle speed.

In all of these systems, however, only a level of torque is variable. Advanced steering functions—such as active return, pull-compensation, lane-keeping, and park-assist—are not achievable.

SUMMARY OF INVENTION

In accordance with an exemplary embodiment of the invention, a hydraulic-power steering system of a vehicle is provided. The steering system includes generally a power-steering valve configured to control and vary a level of steering assist. A magnetic actuator is configured to vary torsional stiffness of the power-steering valve to change torque and produce a sufficient amount of the torque to generate full assist. A first valve is operatively connected to a pump and allows the full assist at a relatively low steering torque and through which flow from the pump is directed. A second valve is operatively connected to the pump. Current is applied to a solenoid valve that allows an increasing amount of the flow to be directed through the second valve in response to an input signal of increasing vehicle speed above a threshold value and closes in response to a signal identifying any of a plurality of advanced steering functions.

With the steering system of the invention, advanced steering functions, such as active return, pull-compensation, lane-keeping, and park-assist, are achievable in a hydraulic steering system.

These and other advantages and features of the invention are more apparent from the following brief description taken in conjunction with the accompanying drawing.

BRIEF DESCRIPTION OF DRAWING

The subject matter that is regarded as the invention is particularly pointed out and distinctly claimed in the claims found at the conclusion of the specification. The foregoing and other advantages and features of the invention are apparent from the following detailed description taken in conjunction with the accompanying drawing in which:

DETAILED DESCRIPTION

Magnetic steer is a "variable effort" system that uses a magnetic actuator to vary torsional stiffness of a power-steering valve to change actuation, effort, or torque. A control module determines magnitude and direction of current applied to an excitation coil of the magnetic actuator to vary the torque as a function of speed of a vehicle.

In accordance with exemplary embodiments, magnetic steer with torque overlay or magnetic torque overlay (MTO) is a system that has been developed to achieve advanced steering features or functions—such as active return, pull-compensation, lane-keeping, and park-assist. MTO modifies magnetic steer to provide capability of generating assist for the advanced steering functions without torque of a driver of the vehicle.

Figure 1:
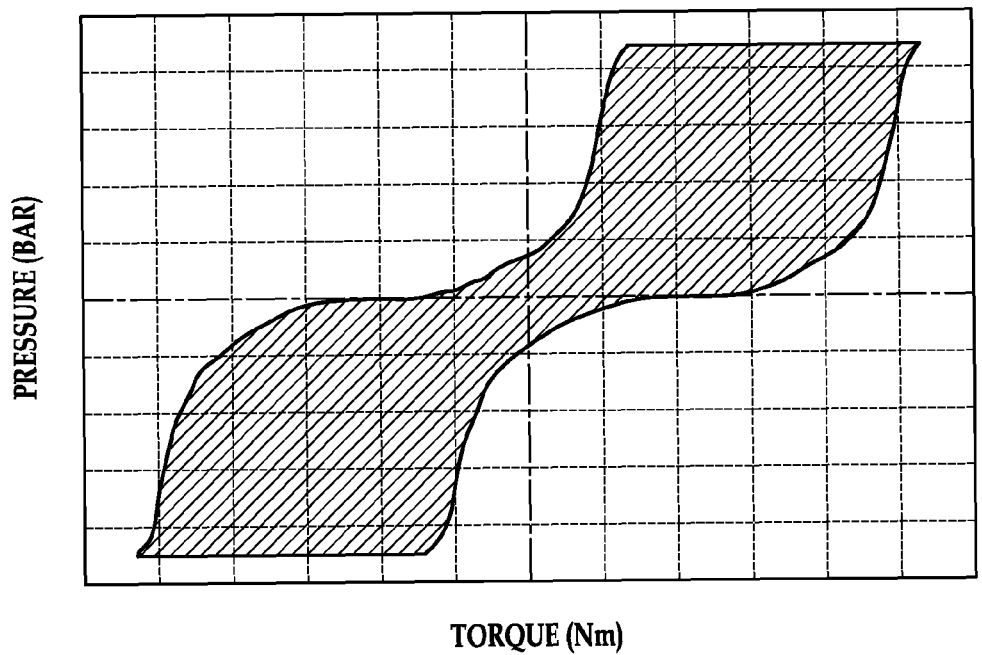
FIG. 1 illustrates a "torque vs. pressure" curve in accordance with an exemplary embodiment of the invention.

Range of the system is illustrated in FIG. 1, which is a plot showing "pressure vs. effort (torque)" in connection with a magnetic actuator of MTO. The magnetic actuator can be powered with, for example, positive three amps and negative three amps (the torque being in "newton meters" and the pressure being in "bars"). However, it should be appreciated that the magnetic actuator can be powered with any suitable amount of current.

In one embodiment, MTO provides torque-overlay functions without providing a full level of hydraulic assist. To provide a steering function such as park-assist, the magnetic actuator is able to produce a sufficient amount of torque on a hydraulic rotary valve to generate full assist in a steering gear. In this way, the torque applied to a steering wheel is sufficiently augmented such that parking or turning tight corners can be done with little effort. Also, when the vehicle is driven at low speed, power steering gives the full assist so the driver can turn the steering wheel easily. However, as the vehicle speed increases, an amount of assist from the power steering is reduced to less than full such that the steering wheel becomes more difficult to turn. This provides the driver more feedback about road conditions through the steering wheel and, thus, better control of the vehicle. If an emergency arises and the driver needs to turn the steering wheel quickly, the full assist is provided almost immediately after the steering wheel is turned only a few degrees.

In previous magnetic steering systems, the magnetic actuator must be large to accommodate necessary assist. This is necessarily expensive to produce and difficult to package within the vehicle.

In accordance with the invention, a parallel-valve configuration is used. This allows a full-assist function, such as park-assist, to be performed without having to use a larger magnetic actuator.

Referring now to FIGS. 2 through 5, a hydraulic-power steering system 10 of the invention is described below with reference to specific exemplary embodiments without limiting same. In the steering system 10, steering assist is controlled by a power-steering valve 12 that is configured to control and vary a level of the steering assist as a function of speed of a vehicle (not shown).

Figure 2:
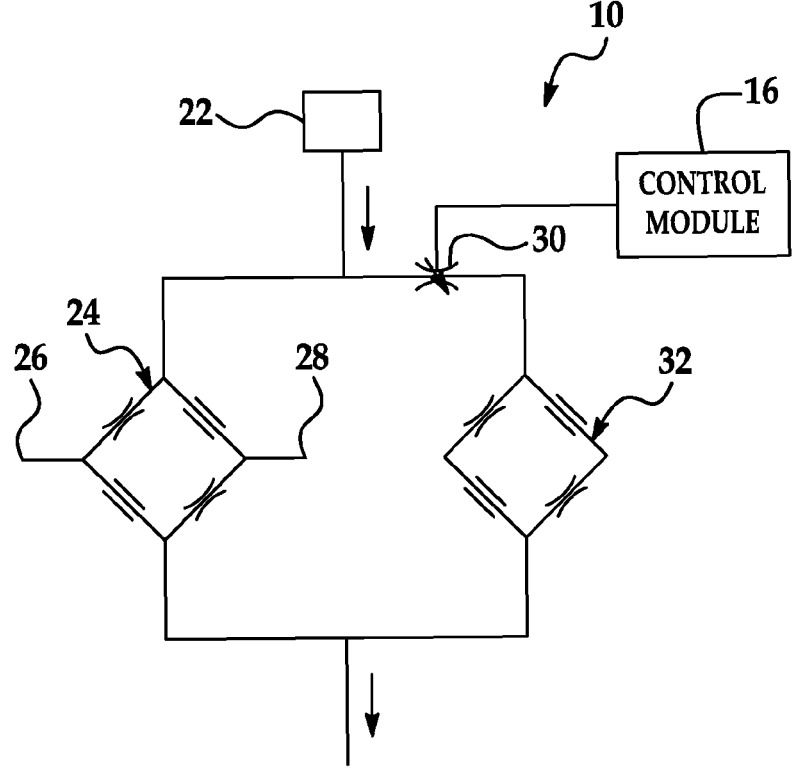
FIG. 2 schematically illustrates a "parallel valve" configuration in accordance with an exemplary embodiment of the invention.

As schematically shown in FIG. 2, the power-steering valve 12 is configured as a parallel valve 12. A magnetic actuator 14 is configured to vary torsional stiffness of the power-steering valve 12 to change torque and produce a sufficient amount of the torque to generate full assist. A control module 16 is configured to determine magnitude and direction of the current applied to the magnetic actuator 14 to vary the torque as a function of the vehicle speed. The magnetic actuator 14 produces a sufficient amount of torque on a hydraulic rotary valve 18 to generate the full assist in a steering gear 20. A pressure sensor measures differential pressure of the power-steering valve 12 to determine an amount of the current required for the excitation coil.

With the parallel valve configuration, at lower speeds of the vehicle, all flow from a hydraulic steering pump 22, is directed through a first valve 24. The first valve 24 is operatively connected to the steering pump 22 and first and second cylinders 26, 28 and allows the full assist at a relatively low steering torque.

As speed of the vehicle increases, the control module 16 applies the current to a solenoid valve 30 that allows an increasing amount of the flow to be directed through a second valve 32, which is also operatively connected to the steering pump 22, in response to an input signal of increasing vehicle speed above a threshold value. This requires an increase in the torque applied by the driver for the valves 24, 32 to generate a substantially equal amount of torque with respect to each other applied to a steering wheel (same assist level). At higher speeds of the vehicle, the solenoid valve 30 is fully open, allowing the flow to be shared between the valves 24, 32. This requires a maximum amount of torque achievable with the steering system 10 to generate the same assist level. It should be appreciated that the second valve 32 can be operatively connected to the first and second cylinders 26, 28.

The second valve 32 can be disconnected from the steering pump 22 by closing the solenoid valve 30, which is normally open. A smaller amount of the torque is required to close the first valve 24 while a larger amount of the torque is required to close the second valve 32.

Figure 3:
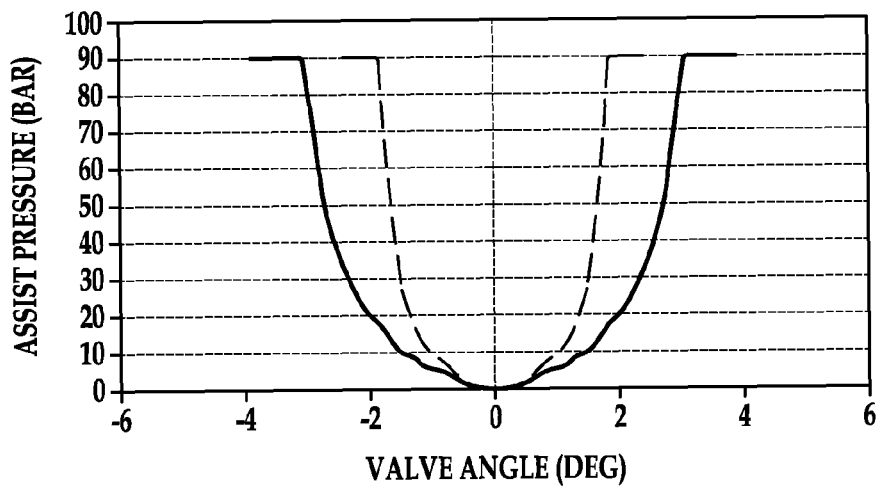
FIG. 3 illustrates an "assist" curve in accordance with an exemplary embodiment of the invention.

FIG. 3 illustrates resulting "assist" curves for respective conditions when the solenoid valve 30 is open or closed. More specifically, plots of "Valve Angle" (independent variable) and "Assist Pressure" (dependent variable) are shown (the valve angle being in "degrees" and the assist pressure being in "bars"), wherein the dashed curve represents the first valve 24 and the solid curve represents a combination of the valves 24, 32 with each other.

The steering system 10 can utilize a lower-cost two-position solenoid valve 30. In an "off" (or "open") position, MTO provides the advanced steering functions that require only less than the full assist. When an advanced steering function such as park-assist is activated, the solenoid valve 30 is closed. This allows the full assist to be generated at a lower torque level that can be supplied by the magnetic actuator 14.

Figure 4:
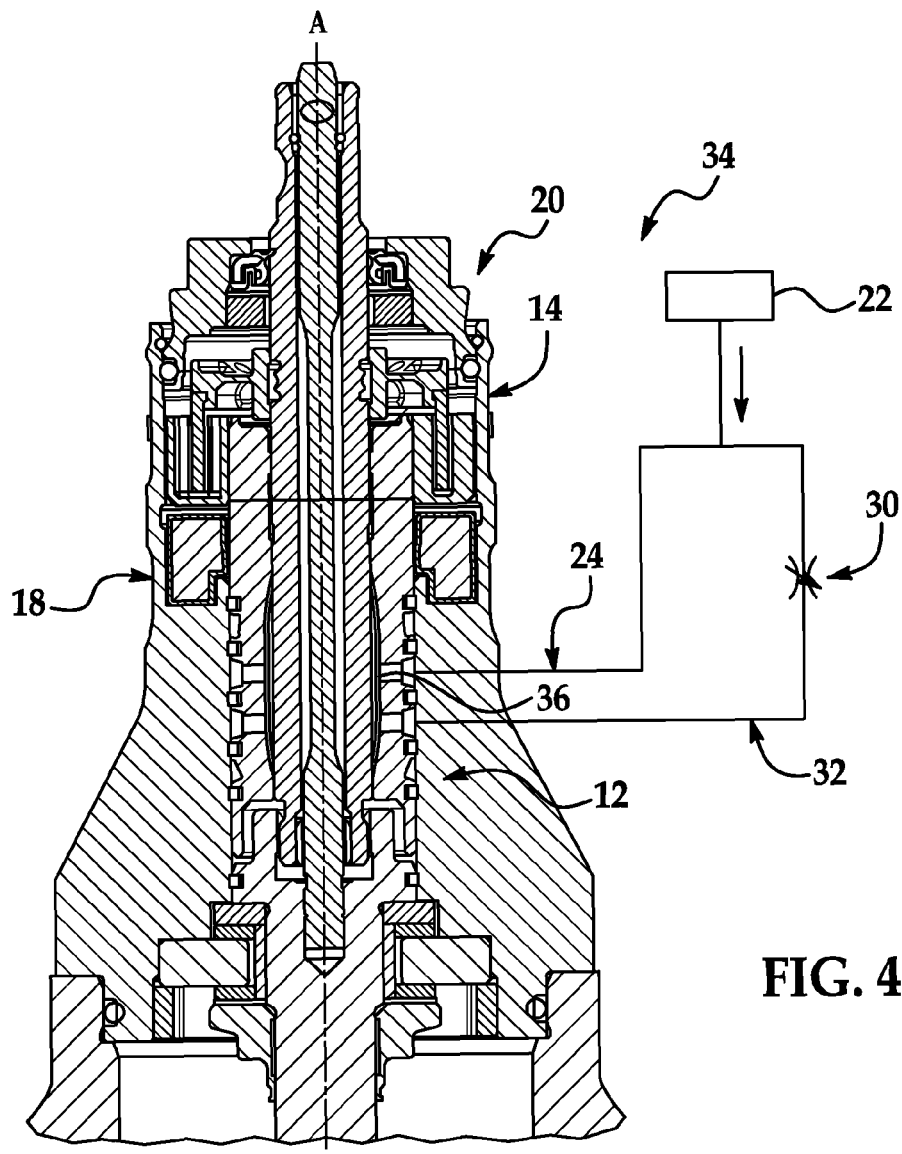
FIG. 4 is a cross-sectional view in accordance with an exemplary embodiment of the invention.

FIG. 4 illustrates an axial cross-section of a valve assembly 34. An annular groove 36 is added to the power-steering valve 12 to provide a hydraulic connection for the valves 24, 32.

Figure 5:
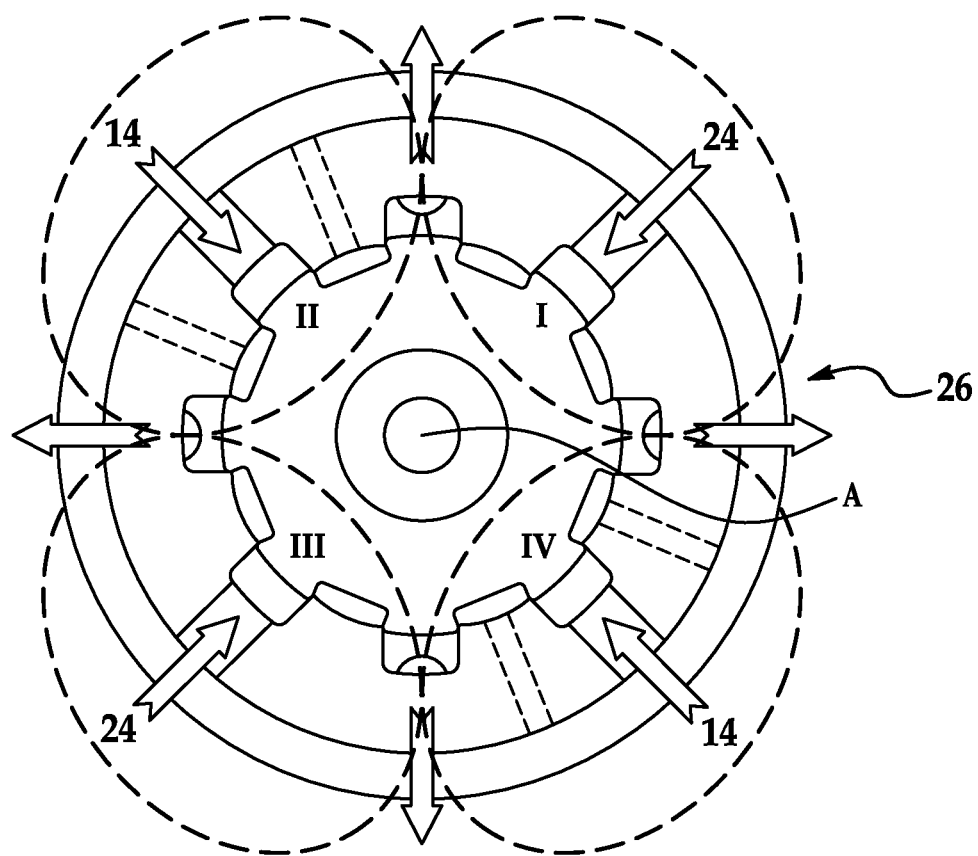
FIG. 5 is a cross-sectional view in accordance with an exemplary embodiment of the invention.

FIG. 5 illustrates a cross-section of FIG. 4 normal to an axis "A" of the valve assembly 34. In a traditional valve assembly, all four quadrants (I, II, III, IV) of the valve assembly would be configured to function as a single valve. In the valve assembly 34, however, the second and fourth quadrants are configured to create the first valve 24, and the first and third quadrants are configured to create the second valve 32.

While the invention has been disclosed in detail in connection with only a limited number of embodiments, it should be readily understood that the invention is not limited to such embodiments. Rather, the invention can be modified to incorporate any number of variations, alterations, substitutions, or equivalent arrangements not heretofore disclosed, but that are commensurate with the spirit and scope of the invention. Additionally, while various embodiments of the invention have been disclosed, it is to be understood that aspects of the invention may include only some of these embodiments. Accordingly, the invention is not to be seen as limited by the foregoing disclosure.

Having thus described the invention, it is claimed:

1. A hydraulic-power steering system comprising:
   a power-steering valve that is configured to control and vary a level of steering assist;
   a magnetic actuator that is configured to vary torsional stiffness of the power-steering valve to change torque and produce a sufficient amount of the torque to generate full assist;
   a steering pump;
   a first valve that is operatively connected to the steering pump and allows the full assist at a relatively low steering torque and through which flow from the steering pump is directed;
   a second valve that is operatively connected to the steering pump; and
   a solenoid valve to which current is applied and that allows an increasing amount of the flow to be directed through the second valve in response to an input signal of increasing vehicle speed above a threshold value and closes in response to a signal identifying any of a plurality of advanced steering functions.

2. The steering system of claim 1, wherein the advanced steering function is park-assist.

3. The steering system of claim 1, wherein the power-steering valve is configured as a parallel valve.

4. The steering system of claim 1, wherein the power-steering valve defines an annular groove to provide a hydraulic connection for the first and second valves.

5. The steering system of claim 1, wherein the steering system comprises further a control module that is configured to apply the current to the solenoid valve and determine magnitude and direction of the current applied to the magnetic actuator to vary the torque.

6. The steering system of claim 1, wherein the steering system comprises further a hydraulic rotary valve and steering gear and the magnetic actuator produces a sufficient amount of torque on the hydraulic rotary valve to generate the full assist in the steering gear.

7. The steering system of claim 1, wherein the first valve is operatively connected to first and second cylinders.

8. The steering system of claim 1, wherein the increasing amount of the flow directed through the second valve as the speed of the vehicle increases requires an increase in the torque applied for the first and second valves to generate a same assist level.

9. The steering system of claim 1, wherein, at higher speeds of the vehicle, the solenoid valve is fully open, allowing the flow to be shared between the first and second valves.

10. The steering system of claim 1, wherein the second valve is disconnected from the steering pump by closing the solenoid valve.

11. The steering system of claim 1, wherein an amount of the torque that is required to close the first valve is smaller than an amount of the torque that is required to close the second valve.

12. The steering system of claim 1, wherein the solenoid valve is a two-position solenoid valve.

13. A hydraulic-power steering system comprising:
    a power-steering valve that is configured to control and vary a level of steering assist as a function of speed of a vehicle;
    a magnetic actuator that is configured to vary torsional stiffness of the power-steering valve to change torque and produce a sufficient amount of the torque to generate full assist;
    a first valve that allows the full assist at a relatively low steering torque and through which flow is directed below a first vehicle speed;
    a second valve; and
    a solenoid valve to which current is applied and that allows an increasing amount of the flow to be directed through the second valve in response to an input signal of increasing vehicle speed above the first vehicle speed and closes in response to a signal identifying any of a plurality of advanced steering functions.

14. The steering system of claim 13, wherein the advanced steering function is park-assist.

15. The steering system of claim 13, wherein the power-steering valve is configured as a parallel valve.

16. The steering system of claim 13, wherein the power-steering valve defines an annular groove to provide a hydraulic connection for the first and second valves.

17. The steering system of claim 13, wherein the steering system comprises further a control module that is configured to apply the current to the solenoid valve and determine magnitude and direction of the current applied to the magnetic actuator to vary the torque.

18. The steering system of claim 13, wherein the steering system comprises further a hydraulic rotary valve and steering gear and the magnetic actuator produces a sufficient amount of torque on the hydraulic rotary valve to generate the full assist in the steering gear.

19. The steering system of claim 13, wherein the first valve is operatively connected to first and second cylinders.

* * * * *